(12) United States Patent  (10) Patent No.: US 7,661,855 B2
Matthew et al.  (45) Date of Patent: *Feb. 16, 2010

(54) RETRACTABLE REEL ASSEMBLY

(75) Inventors: Norman L. Matthew, Highland Park, IL (US); Vincent Alesi, Kildeer, IL (US)

(73) Assignee: Custom Accessories, Inc., Niles, IL (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/334,587

(22) Filed: Dec. 15, 2008

(65) Prior Publication Data

US 2009/0090589 A1   Apr. 9, 2009

Related U.S. Application Data

(63) Continuation of application No. 11/548,778, filed on Oct. 12, 2006, now Pat. No. 7,478,927.

(60) Provisional application No. 60/730,985, filed on Oct. 28, 2005.

(51) Int. Cl.
   *F21V 27/00*   (2006.01)
(52) U.S. Cl. .................. 362/387; 362/258
(58) Field of Classification Search .......... 362/109, 362/184, 190, 191, 258, 387, 391; 242/278.1, 242/378, 385, 388.1, 405; 191/12.4, 12 R, 191/12.2 R
See application file for complete search history.

(56) References Cited

U.S. PATENT DOCUMENTS

| | | | |
|---|---|---|---|
| 1,329,051 A | 1/1920 | Lorentzen | |
| 1,831,666 A | 11/1931 | Jacobia | |
| 2,784,305 A * | 3/1957 | Lawson et al. | 362/258 |
| 2,905,925 A | 9/1959 | Whiteneck | |
| 2,952,420 A | 9/1960 | Von Hoorn | |
| 4,075,470 A | 2/1978 | Moore | |
| D286,503 S | 11/1986 | Bobrovniczky | |
| 5,195,823 A | 3/1993 | Sidabras | |
| D341,076 S | 11/1993 | Kolton | |
| D363,461 S | 10/1995 | Duckman et al. | |
| D387,062 S | 12/1997 | Heine | |
| D387,776 S | 12/1997 | Chan | |
| D391,549 S | 3/1998 | Ness | |
| 5,732,898 A | 3/1998 | Odessky et al. | |
| 5,769,526 A | 6/1998 | Shaffer | |
| D415,998 S | 11/1999 | Brown et al. | |

(Continued)

OTHER PUBLICATIONS

Product information for a magnetic mount power light manufactured and sold by Custom Accessories, Inc. (Rev. Jul. 16, 2003).

*Primary Examiner*—Y My Quach Lee
(74) *Attorney, Agent, or Firm*—Patzik, Frank & Samotny Ltd.

(57) ABSTRACT

A reel assembly includes an electrical cord, and a reel encased within a housing and capable of winding and unwinding the electrical cord. A power connector electrically couples one end of the electrical cord to a power source, such as a vehicle's cigarette lighter receptacle or 12 volt accessory power outlet. A powered device, such as a lamp, or flashlight, may be electrically coupled to an intermediate connector at the other end of the electrical cord. Connectors coupled to the electrical cord are removably attachable to the housing of the reel assembly.

8 Claims, 9 Drawing Sheets

U.S. PATENT DOCUMENTS

| | | |
|---|---|---|
| D419,527 S | 1/2000 | Hwang |
| D419,528 S | 1/2000 | Hakoda |
| D428,327 S | 7/2000 | Stekelenburg |
| D430,111 S | 8/2000 | Liao |
| D430,851 S | 9/2000 | Hwang |
| D432,084 S | 10/2000 | Miller |
| 6,226,381 B1 * | 5/2001 | Huang ............... 242/388.1 |
| 6,273,354 B1 | 8/2001 | Kovacik et al. |
| D451,075 S | 11/2001 | Hwang |
| 6,439,360 B1 | 8/2002 | Miller |
| D465,222 S | 11/2002 | Wang |
| 6,679,448 B1 | 1/2004 | Carpenter et al. |
| D488,448 S | 4/2004 | Ranger |
| 6,851,530 B2 | 2/2005 | Wei |
| 7,114,603 B2 | 10/2006 | Lai |
| D560,005 S | 1/2008 | Matthew |
| D580,857 S | 11/2008 | Matthew |
| 7,478,927 B2 * | 1/2009 | Matthew et al. ............ 362/387 |
| 2006/0146455 A1 * | 7/2006 | Keller ..................... 361/42 |

* cited by examiner

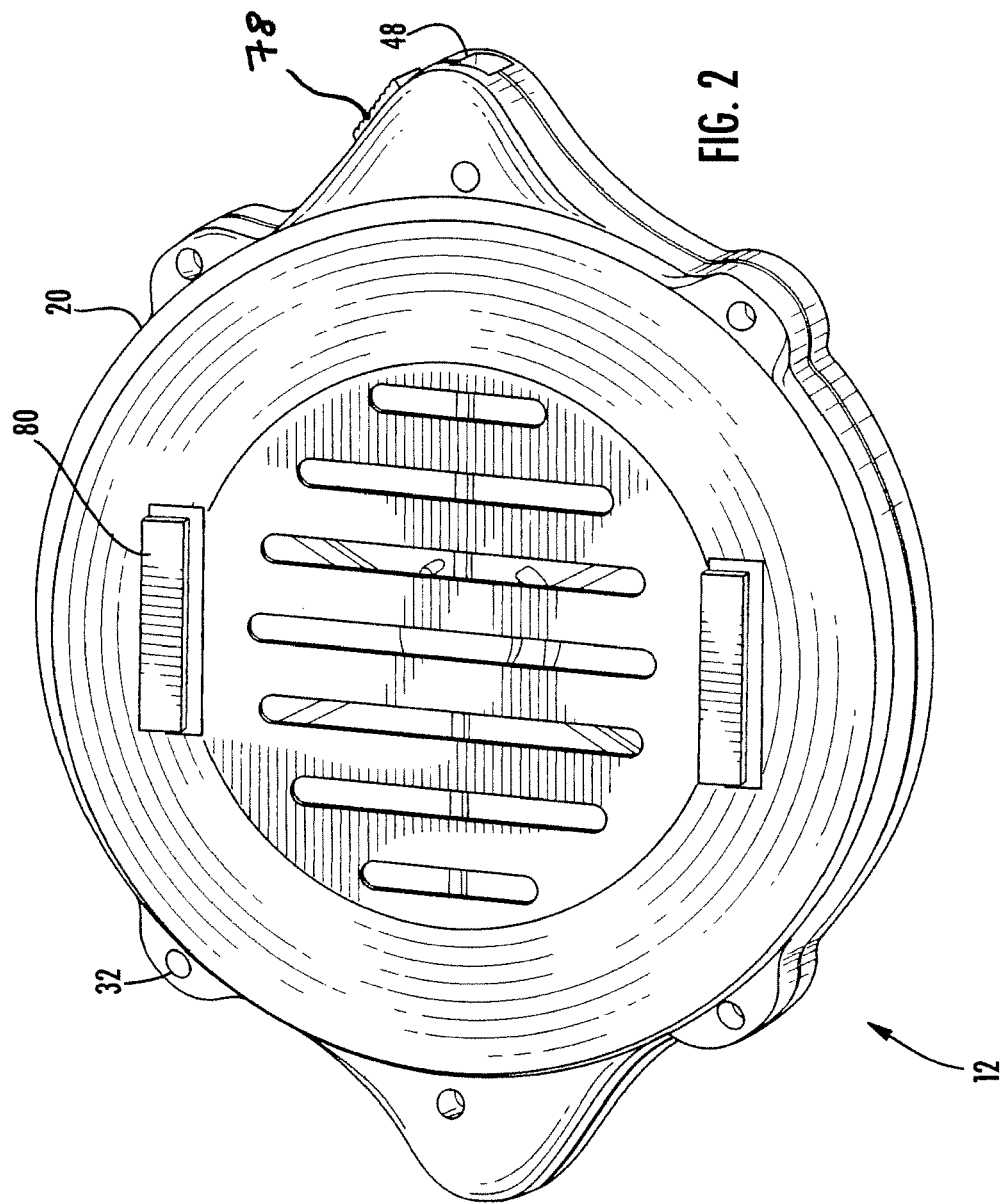
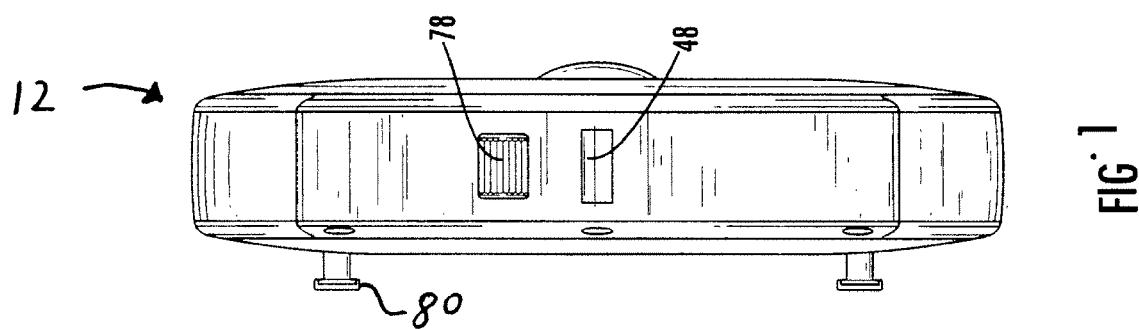

RETRACTABLE REEL ASSEMBLY

CROSS-REFERENCE TO RELATED APPLICATIONS

This application is a continuation of U.S. application Ser. No. 11/548,778, filed on Oct. 12, 2006, the entirety of which is hereby incorporated by reference, which claims priority to U.S. application Ser. No. 60/730,985, filed on Oct. 28, 2005, the entirety of which is hereby incorporated by reference.

BACKGROUND OF THE INVENTION

1. Field of the Invention

This invention relates in general to power cords, and more particular, to a portable power cord reel assembly for use in conjunction with, for example, utility lights for use with motor vehicles and the like.

2. Description of Related Art

Utility lights, such as utility lights powered by a vehicle's cigarette lighter receptacle, or 12 volt accessory power outlet, have been known for some time. Such prior art utility lights often employ a power adapter within a first housing, a lamp, or flashlight within a second housing, and a power cord interconnecting the two housings. A clip, coupled to the second housing, is sometimes provided to permit the flashlight to be attached to a sun visor, a vehicle's hood, or another convenient surface, two allow the flashlight to be directed to a target in a "hands free" fashion, permitting the user to use both hands to, for example, conduct an inspection or repair of the vehicle's engine or other components.

BRIEF SUMMARY OF THE INVENTION

The present invention comprises a reel assembly which may be used, for example, in conjunction with utility lights.

It is another object of the present invention to provide an improved, separate reel assembly for use, for example, with a compact light assembly.

Other objects, features and advantages of the invention will be apparent from the following detailed disclosure, taken in conjunction with the accompanying sheets of drawings, wherein like reference numerals refer to like parts.

BRIEF DESCRIPTION OF THE SEVERAL VIEWS OF THE DRAWINGS

FIG. 1 is a side view of the housing of the reel assembly of the present invention showing an opening for a retractable cord and a button for retracting the cord;

FIG. 2 is a perspective view of the reel assembly housing of FIG. 1 showing a pair of flanges for receiving the female connector and plug;

DETAILED DESCRIPTION OF THE INVENTION

Figure 3:
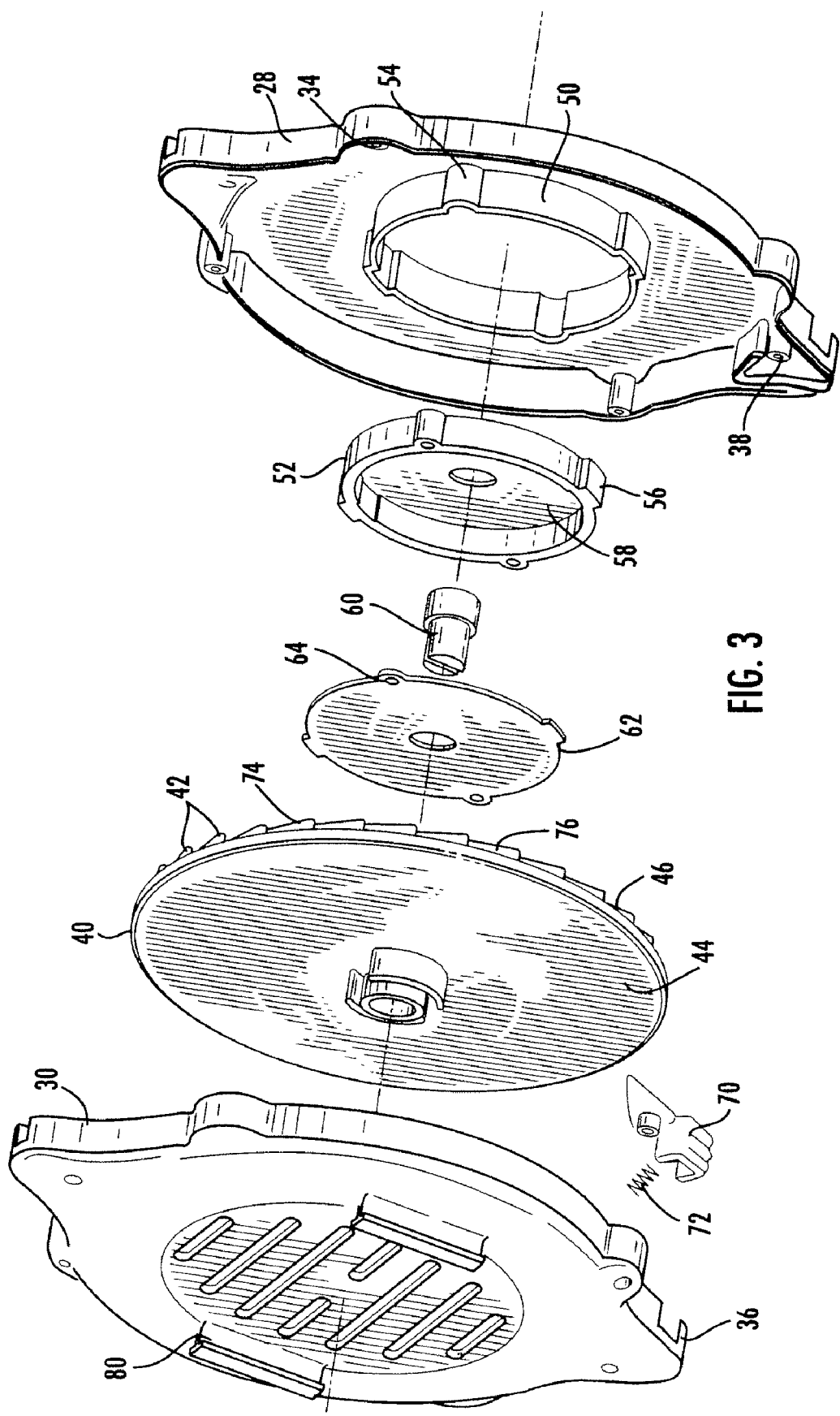
FIG. 3 is an exploded perspective view of the reel assembly housing of FIG. 1.
Figure 4:
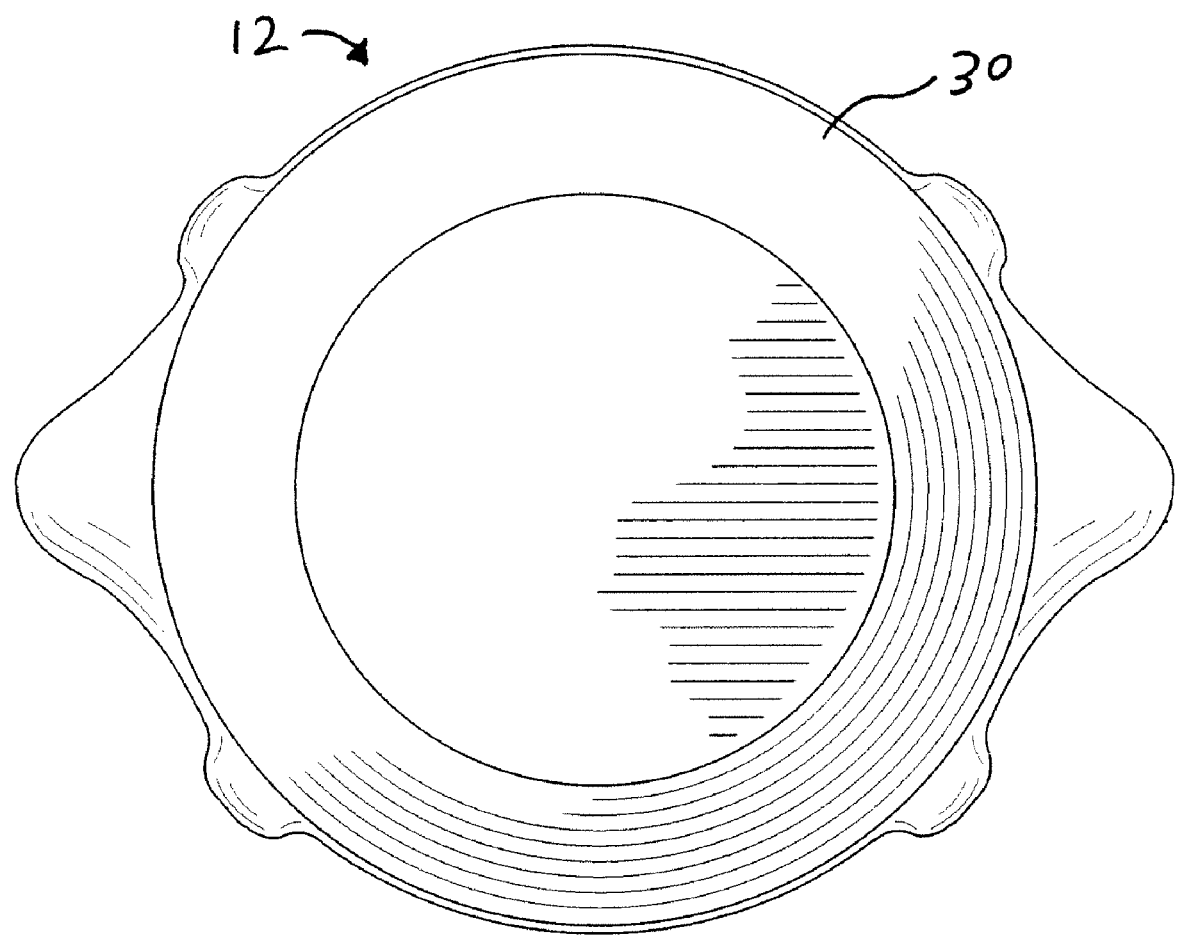
FIG. 4 is a bottom plan view of the reel assembly housing of FIG. 1.
Figure 5:
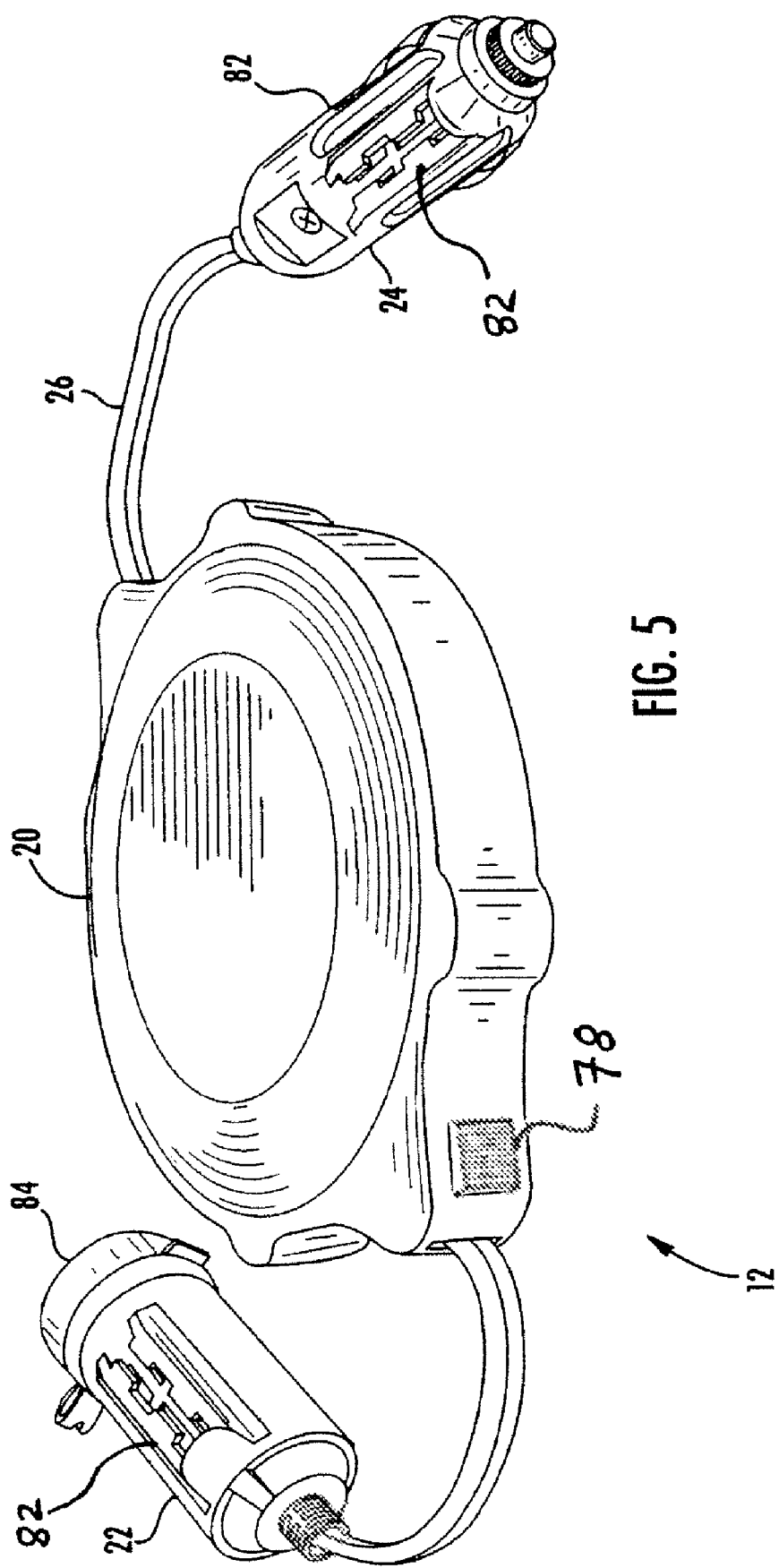
FIG. 5 is a perspective view of the reel assembly housing of the present invention attached to a female connector and a plug.
Figure 6:
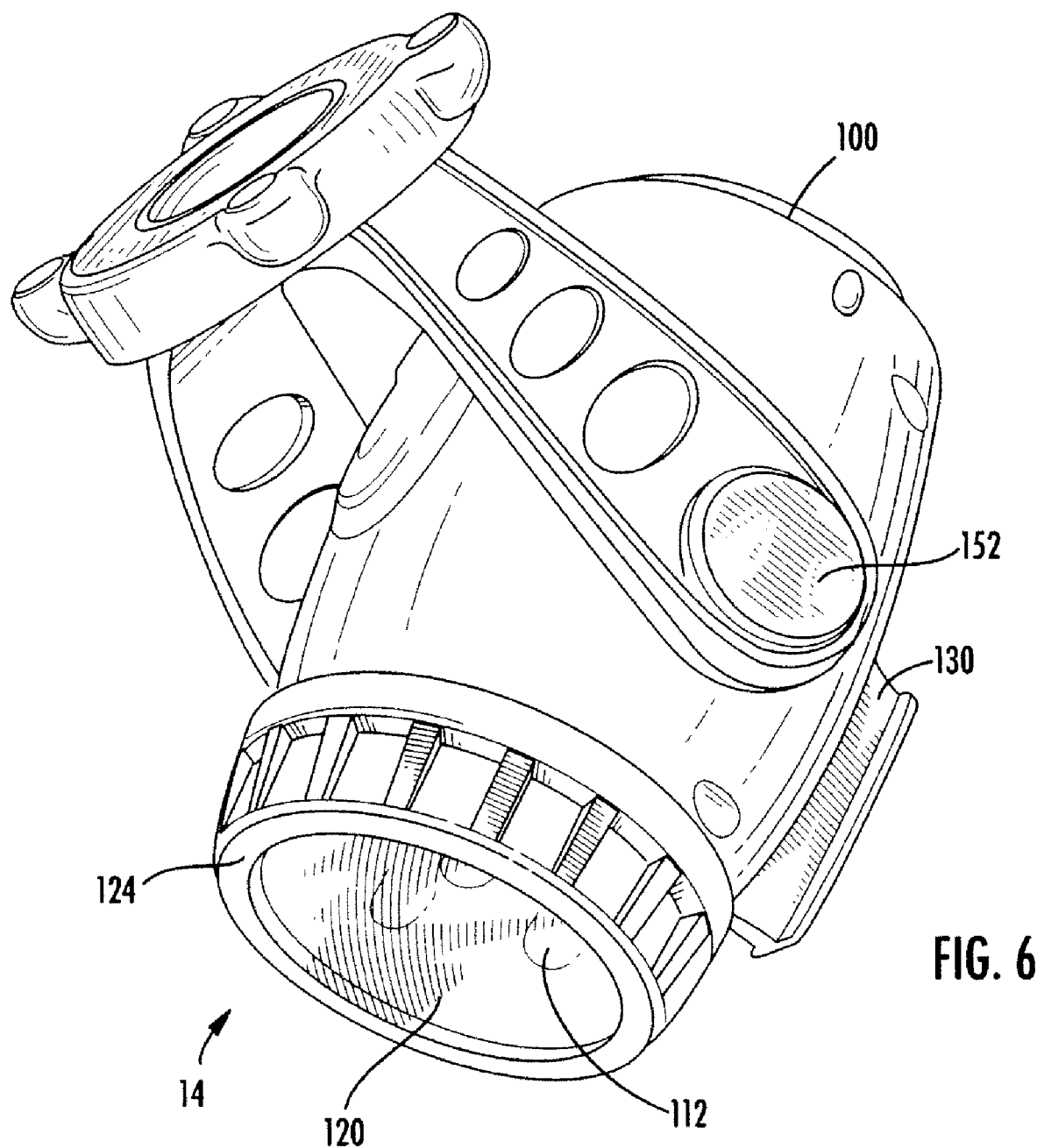
FIG. 6 is a perspective view of the light housing and base of the present invention.

While this invention is susceptible of embodiment in many different forms, there is shown in the drawings and will herein be described in detail one preferred embodiment, with the understanding that the present disclosure is to be considered merely an exemplification of the principles of the invention and the application is limited only to the appended claims.

Referring now to the drawings, and particularly to FIGS. 1 through 10, there is shown a preferred embodiment of the present invention. The vehicular light of the present invention, generally designated by the number 10, is shown as having a reel assembly 12 and a light assembly 14. While the light is disclosed as being attachable to a vehicle surface, it is appreciated that it may be attached to other surfaces and not depart from the scope of the present invention.

As shown in FIGS. 1 thorough 5, the reel assembly 12 comprises a housing 20, and a female outlet or connector 22 and a male plug or connector 24 connected by a conventional electrical cord 26. In this example, the connector is a 12V receptacle and the plug is a 12V plug. The housing is preferably formed from a bottom member 28 and a top member 30 that are attached together. Referring to FIGS. 2 and 3, the top member of the housing may include a plurality of holes or recesses 32 spaced about its perimeter that permit a plurality of screws or other threaded fasteners (not shown) to extend through and engage a plurality of threaded holes 34 on the bottom member 28. The top member 30 may also include one or more pins 36 for engaging corresponding holes 38 on the bottom member 28 to facilitate the proper alignment of the housing member 28, 30 during the attachment process. While the reel housing is shown as substantially circular, it is appreciated that it may be of a variety of shapes including, but not limited to, circular, oval, square or triangular and not depart from the scope of the present invention.

Referring again to FIG. 3, the reel assembly 12 includes a disc 40 having a hole extending through the center, a plurality of angular teeth 42 positioned on the periphery of on one side of the disc, and a sleeve 44 extending about the hole on the other side of the disc. Together with the sleeve 44, a pair of curved walls 46, integrally formed on the disc 40 and spaced apart from the sleeve 44, form a reel for winding and unwinding the cord 26 through openings 48 in the housing.

The bottom member 28 of the housing preferably includes a substantially circular wall 50 integrally formed on the inner side therein for defining a recess or chamber for accepting an insert 52. The circular wall may have a plurality of curved slots 54 spaced apart along its circumference for accepting corresponding sleeves 56 on the insert member to maintain the insert in place. A hole 58 in the center of the insert 52 is sized to accommodate the base of a spindle 60. A cover 62 preferably includes a plurality of holes 64 about its periphery to permit screws or other fasteners to be inserted therethrough and into the corresponding sleeve 56 of the insert 52 to attach the cover 62 and insert 52 together.

A clip 70 is biased by a spring 72 towards the ratchet teeth 42 on the disc 40 to promote engagement of the ratchet teeth 42 and the clip 70 to normally retain the cord 26 in place. The angled face 74 of the teeth 42 permits the clip 70 to sequentially move over the engaged tooth 42 to engage the next tooth 42, thereby permitting the cord 26 to be withdrawn from the reel assembly 12. A spring (not shown) associated with the disc 40 in a known way normally biases the disc 40 in a clockwise direction so that the flat wall 76 of one of the teeth 42 engages the clip 70 to prevent the cord 26 from being retracted through the openings 48 into the reel assembly 12. Disengagement of the clip 70 from the teeth 42 may be accomplished by depressing a button 78 on the reel housing which overcomes the force of the spring 72 and biases the clip 70 out of engagement with the teeth 42. Once the clip 70 is removed from engagement with the teeth 42, the spring associated with the disc 40 acts to rotate the disc 40 and thereby retract the cord 26 into the reel housing 20. In particular, the spring may be attached to the spindle such that as the cord is pulled from the housing, the spring will be wound in a way such that depression of the button will permit the spring to return to its initial state and wind the cord.

The housing 20 preferably includes a pair of flanges 80 to permit the female outlet 22 and male plug 24 to be removably attached thereto for storage and use. In the preferred embodiment, the flanges have a substantial T-shaped cross-section for mating with channels 82 extending longitudinally along the female outlet 22 and male plug 24.

The male connector may be any of the known types of connectors for transmitting power, but is preferably a male adapter or connector for engaging a vehicular cigarette light or other similar outlet in a vehicle, home or elsewhere to provide power to the light assembly. Similarly, the female outlet may be any of the known types of outlets for accepting male plugs or connectors, but is preferably a female outlet for accepting a male adapter of the type shown with respect to light assembly 14 and disclosed herein. A cover or cap 84 may be removably attached to the female outlet 22 to prevent dust and other contaminants from damaging or otherwise adversely affecting the electrical contacts in the female outlet. While a male plug and female outlet are shown and disclosed, it is appreciated that the reel assembly may comprise a pair of male plugs or a pair of female outlets, depending upon the plug it will mate with at the power end and/or the light assembly end, and not depart from the scope of the present invention.

Figure 7:
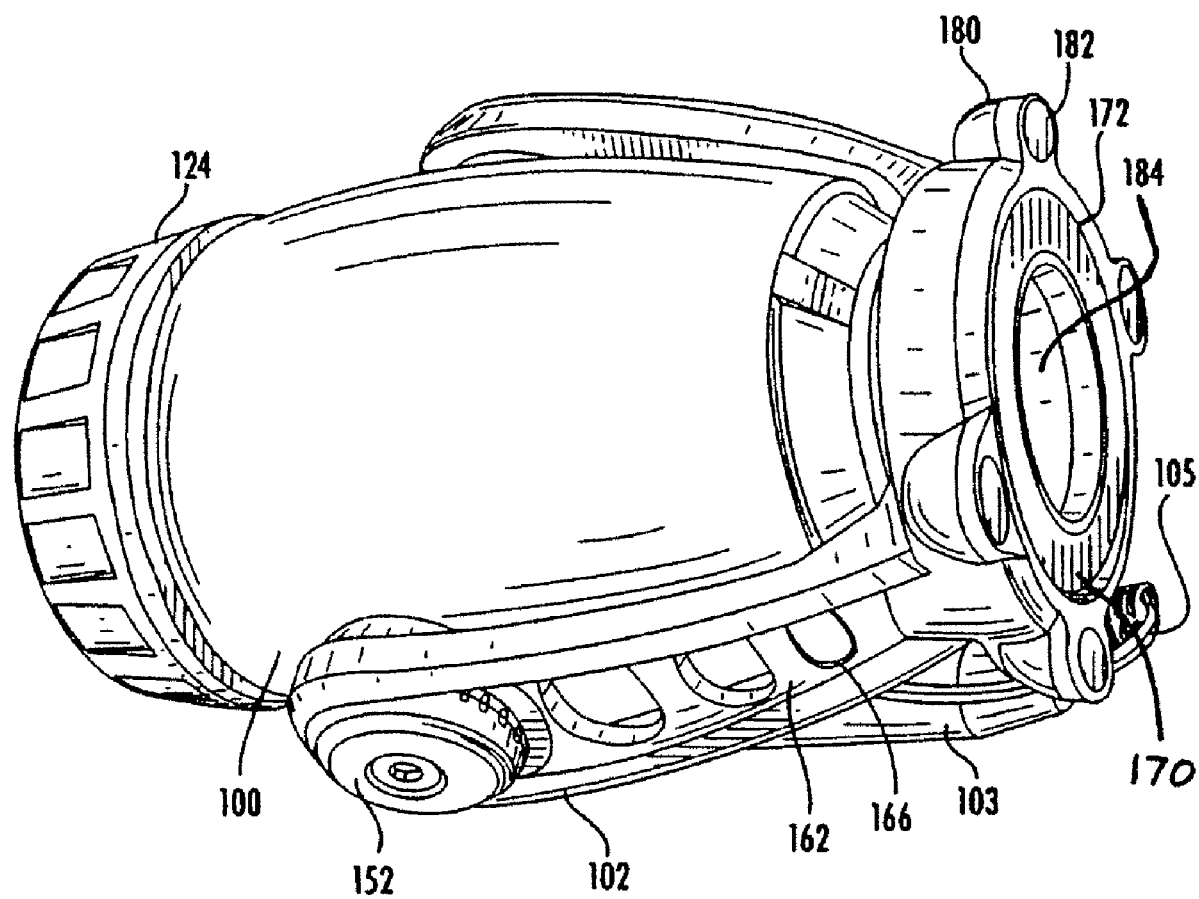
FIG. 7 is a perspective view of the light housing of the present invention having a plug attached to a flange.
Figure 8:
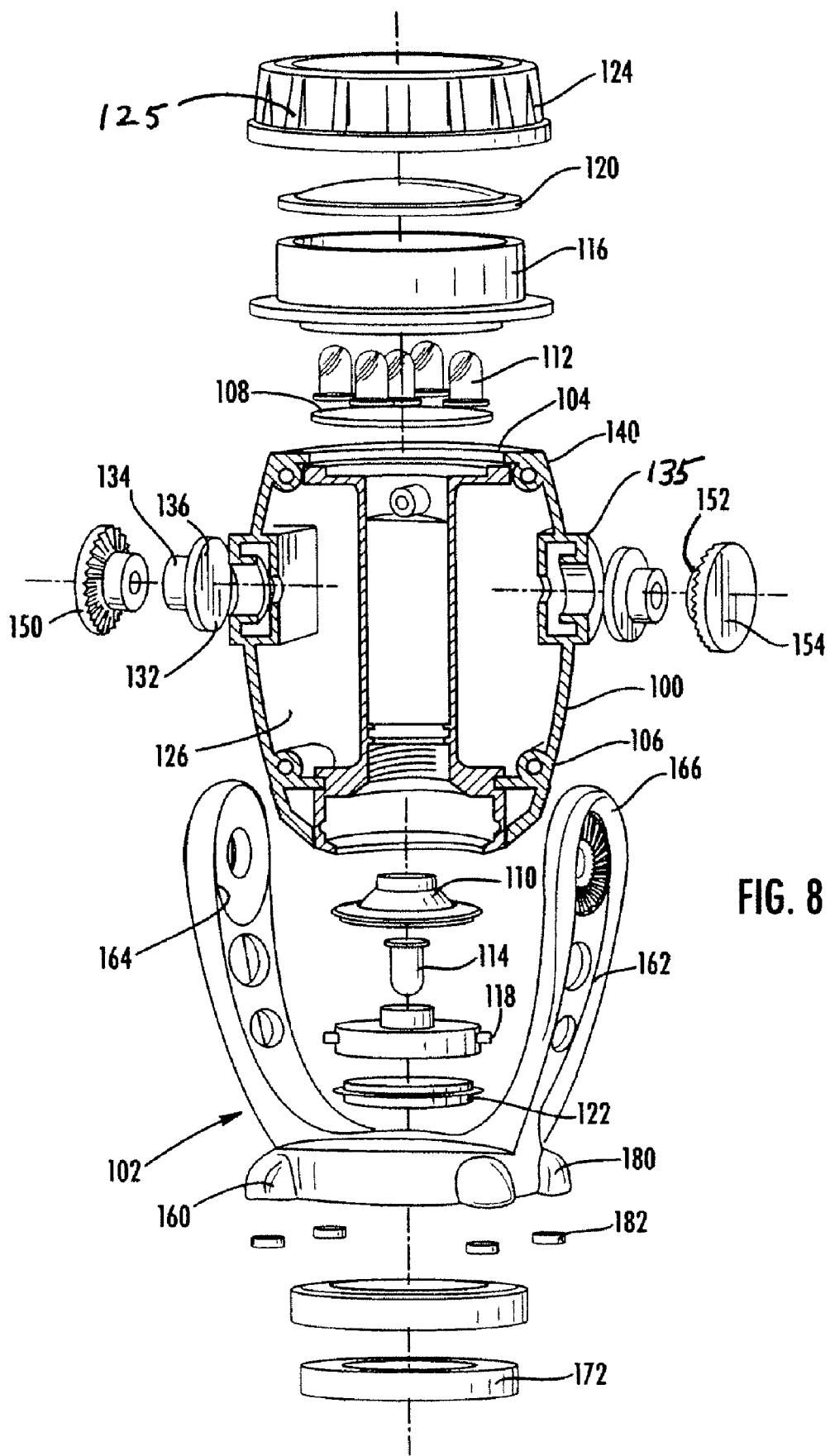
FIG. 8 is an exploded perspective view of the light housing and base of FIG. 6.
Figure 9:
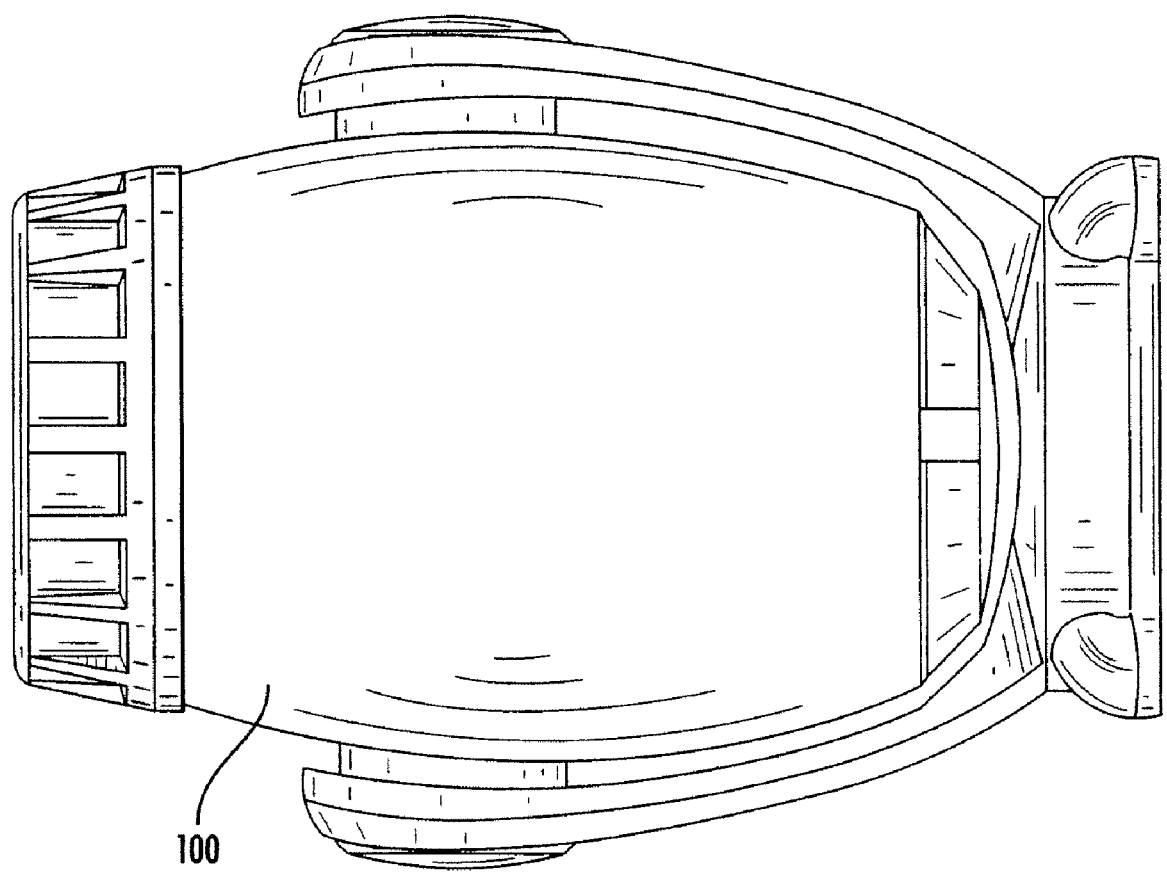
FIG. 9 is a side view of the light housing and base of FIG. 6.
Figure 10:
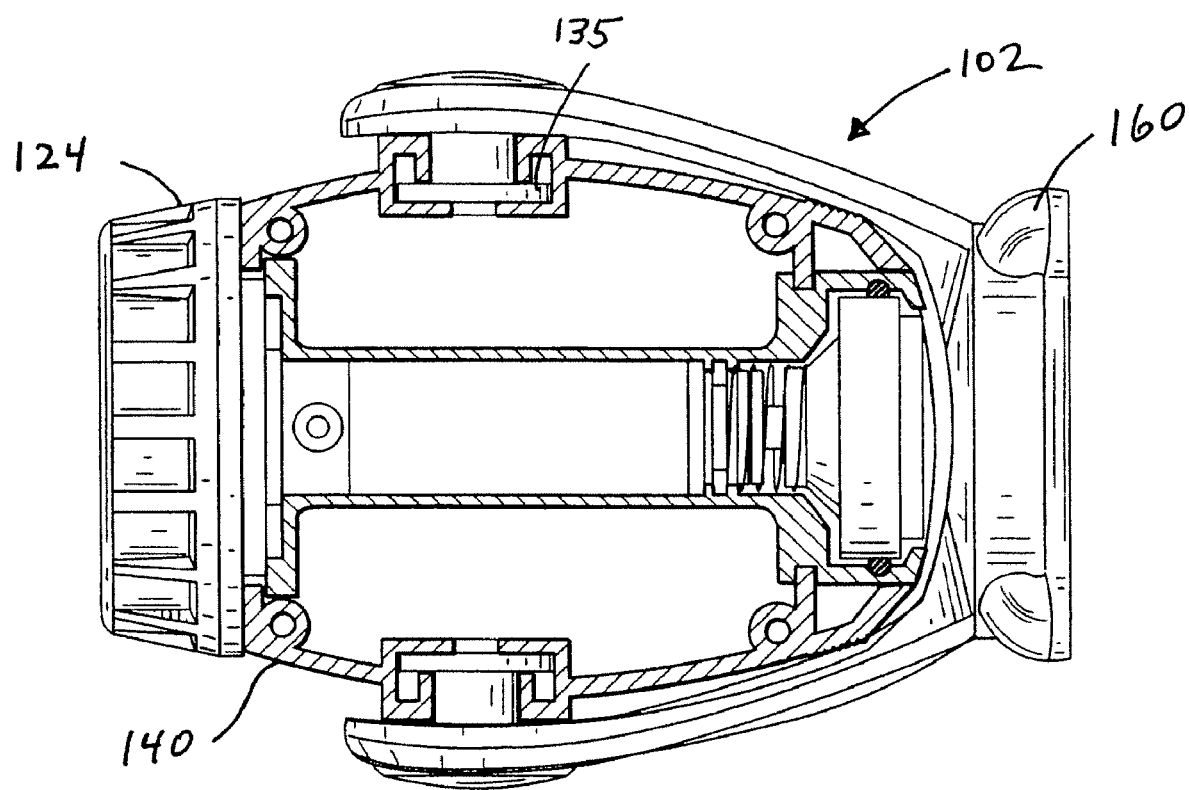
FIG. 10 is a partial cross sectional view of the light housing and base of FIG. 9.

Referring now to FIGS. 6 through 10, the light assembly 14 is shown having a housing 100 pivotally attached to a base member 102, and a male adapter 103 removably attachable to the light housing 100 for connecting to an electrical socket (e.g., vehicle cigarette lighter) to supply power to the light assembly. In the preferred embodiment, the light housing is substantially cylindrical in shape having one or more lights or LEDs on each end. As shown in FIG. 8, the ends of the housing 100, include recessed areas 104, 106 for receiving sockets or plates 108, 110 for receiving and holding the lights in place. The embodiment shown and disclosed show five LEDs 112 spaced apart on one end and a single LED 114 located in socket 110 on the other end. Circuitry within the light assembly connects the LEDs to the male adapter 103 to allow power to be supplied to the LEDs when the adapter is operatively attached to a power source. It is appreciated that any number or type of lights or other visual indicators may be used at each end depending on the amount of illumination needed and not depart from the scope of the present invention.

Housing members 116 and 118 surround the LEDs 112, 114 to provide, among other things, protection for the LEDs. Each of the housing member 116, 118 includes a recessed area for receiving a lens 120, 122, which are preferably made of a plastic material but may be made of other known materials.

A cylindrical member 126 extends through the center of the housing 100 to serve as a reel for winding and storing the electrical cord 105 when it is in the retracted position. The lighting assembly also preferably includes an annular end member 124 that is rotationally attached to the lighting assembly and operatively attached to the electrical cord 105 for the male adapter 103 so that twisting of the end member or cap 124 will wind the electrical cord 105 back into the lighting assembly 14. The end member or cap 124 may include a plurality of grooves and/or raised surface areas 125 to facilitate the gripping of the end member 124 during use. Similar to the reel assembly, it is appreciated that the lighting assembly may also include a spring and button release or other similar automatic retraction system for retracting the electrical cord and not depart from the scope of the present invention.

A flange 130 is preferably located on the top of the light housing 100 to permit the male adapter or connector 103 to be removably attached thereto when not in use. In the preferred embodiment, the flange has a substantial T-shaped cross-section for mating with a channel extending longitudinally along the male adapter 103. The male adapter may be any of the known types of connectors or adapters for transmitting power, but is preferably a male adapter or connector for engaging a vehicular cigarette light or other similar outlet to provide power to the light assembly. It is further appreciated that a female outlet may be used and not depart from the scope of the present invention. An opening adjacent the flange 130 or located otherwise on the housing 100 permits the cord 105 to be withdrawn from and retracted into the housing 100.

The housing 100 preferably includes a pair of diametrically opposed cavities or slots 135 on its sides for receiving a first half 132 of a pivot member. It is preferred that the first half 132 of the pivot member includes a cylindrical sleeve 134 having an inner diameter and an outer diameter, and which extends from a substantially round base 136 having a diameter that is larger than the outer diameter of the sleeve. It is appreciated that in order to facilitate manufacturing of the light assembly, the housing 100 may be comprised of two sections that may be attached together in a known way including through holes 140 and corresponding pins. In order to maintain the first half 132 of the pivot member in the slot 135, the slot preferably has a T-shaped cross-section having walls that extend longitudinally in the slot and are spaced apart a distance that is greater than the outer diameter of the sleeve but less than the diameter of the base. While the sleeve and base preferably include a round or substantially round cross-section, it is appreciated that they may be of a variety of cross-sectional shapes and not depart from the scope of the present invention.

The second half 150 of the pivot member, as shown in FIG. 8, may also include a cylindrical sleeve 152 having an inner diameter and an outer diameter, and which extends from a substantially round base 154 having a diameter that is larger than the outer diameter of the sleeve 152. The outer diameter of the sleeve 152 is preferably sized so that it is slightly smaller than the inner diameter of the sleeve 134 of the first half 132 of the pivot member, thereby creating a snug fit between the pivot member halves to permit the light housing 100 to be rotated to a variety of different angular positions relative to the base member 102 to provide for directional lighting during use. It is appreciated that the sleeve of the first half may also fit within the sleeve of the second half and not depart from the scope of the present invention. Furthermore, while the sleeve and base preferably include a round or substantially round cross-section, it is appreciated that they may be of a variety of cross-sectional shapes and not depart from the scope of the present invention.

The base member 102 preferably include a base 160 and a pair of arms 162 extending upward to form a substantially U-shape member. The ends of the arms 162 include holes 164 that are sized to permit the sleeves, but not the bases, of the halves of the pivot member to extend through. Each arm may include a wall 166 that extends substantially around its perimeter to create a recessed area to permit the base 154 of the second half of the pivot member to be recessed therein during use to prevent any accidental or inadvertent disconnections between the pivot member halves.

The base 160, as shown in FIGS. 7 and 8, also may have an annular recessed area 170 for receiving a magnet 172 to permit the light assembly 14 to be attached to a metallic or ferrous surface of the vehicle to provide light for maintenance (e.g., attaching to side panel to provide illumination for changing a tire at night) or as a warning to other vehicles of the car's presence. While a magnet is shown and disclosed, it is appreciated that other means for securely attaching the light assembly onto a vehicle surface such as, but not limited to, suction cups or clips may be used and not depart from the scope of the present invention.

In order to assist in maintaining the light assembly in place relative to the surface it is attached to, the base 160 may also include a plurality of cavities 180 for receiving discs 182 comprised of material having a high coefficient of friction to inhibit sliding of the light assembly on the surface due to gravity or other forces. Furthermore, the base 160 preferably includes a central hole 184 to permit light from the LED 114 to provide illumination when attaching the light assembly to a vehicle surface.

It will be understood that modifications and variations may be effected without departing from the scope of the novel concepts of the present invention, but it is understood that this application is limited only by the scope of the appended claims.

The invention claimed is:

1. A reel assembly comprising:
    a reel assembly housing;
    an electrical cord having a first end and a second end;
    a reel within the reel assembly housing capable of winding and unwinding at least a portion of the electrical cord; and
    a first electrical connector electrically coupled to an end of the electrical cord;
    wherein the reel assembly housing includes a first flange, the first electrical connector includes a first channel, the first flange and first channel cooperating to permit releasable attachment of the first electrical connector to the reel assembly housing.

2. The invention according to claim 1, further comprising a second electrical connector electrically coupled to an end of the electrical cord, wherein one of the reel assembly housing and the second electrical connector includes a second flange, the other of the reel assembly housing and the second electrical connector includes a second channel, the second flange and second channel cooperating to permit releasable attachment of the second electrical connector to the reel assembly housing.

3. The invention according to claim 2, wherein the reel assembly housing includes the second flange and the second electrical connector includes the second channel.

4. The invention according to claim 2, wherein the intermediate connector is configured to releasably receive a light assembly and to electrically couple the light assembly to the electrical cord.

5. The invention according to claim 1, further comprising a second electrical connector electrically coupled to an end of the electrical cord, wherein the reel assembly housing includes a second flange, and the second electrical connector includes a second channel, the second flange and second channel cooperating to permit releasable attachment of the second electrical connector to the reel assembly housing.

6. The invention according to claim 1, wherein the first electrical connector comprises a power connector.

7. The invention according to claim 1, wherein the first electrical connector comprises an intermediate connector.

8. The invention according to claim 1, wherein the reel assembly further comprises:
    a spring for normally biasing the electrical cord into a retracted position within the reel assembly housing;
    a disc, operatively engaging the electrical cord, the disc having a plurality of angled teeth;
    a clip;
    a spring for biasing the clip into engagement with at least one of the plurality of angled teeth to prevent reverse rotation of the disc and retraction of the electrical cord into the reel assembly housing; and
    a button operatively connected to the clip to selectively release the clip from an engaged position with the at least one tooth.

* * * * *